Aug. 16, 1927.
H. H. RAYMOND
1,639,633
BALL BEARING HINGE
Filed Dec. 14, 1923
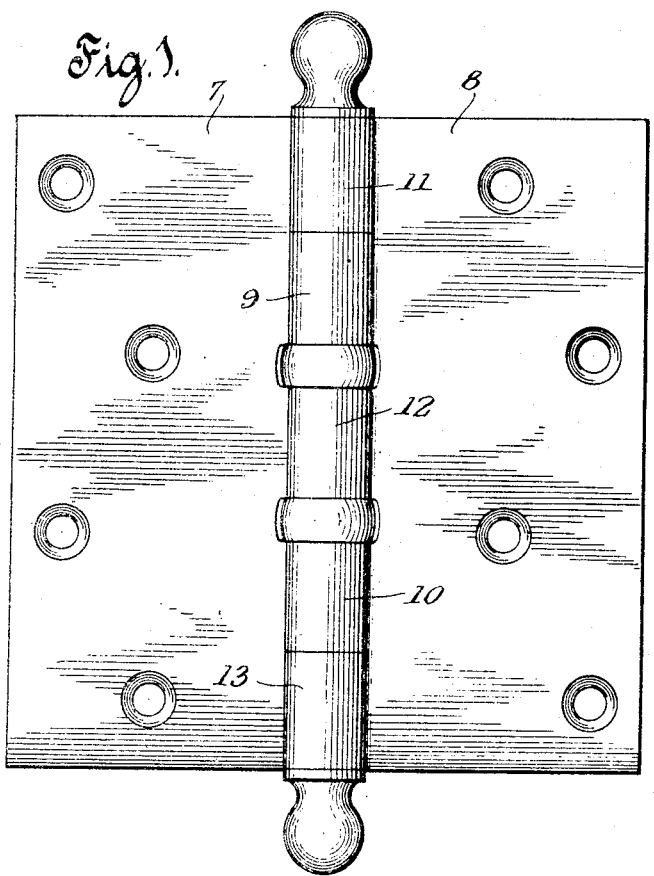
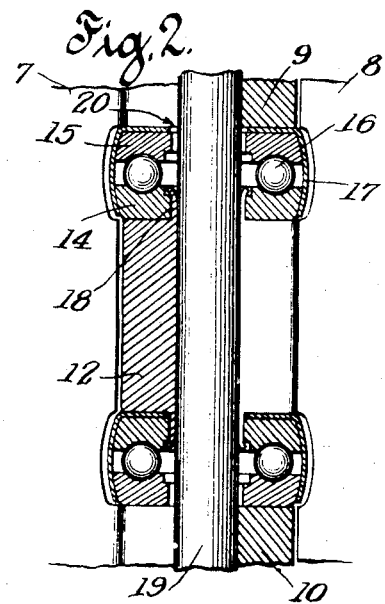
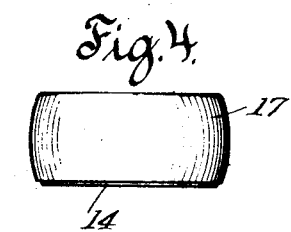
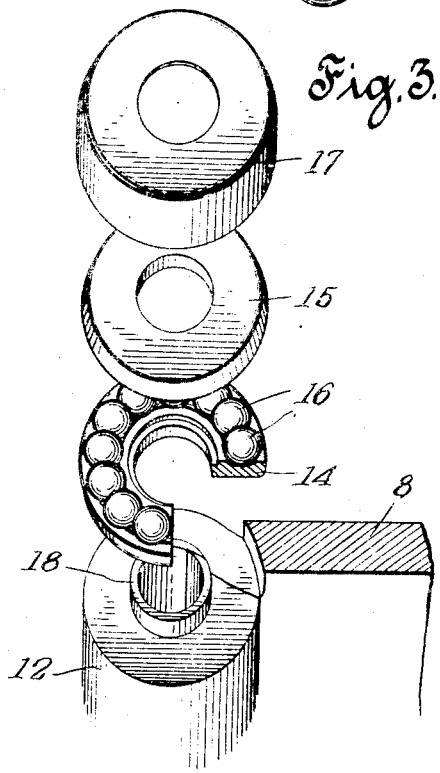
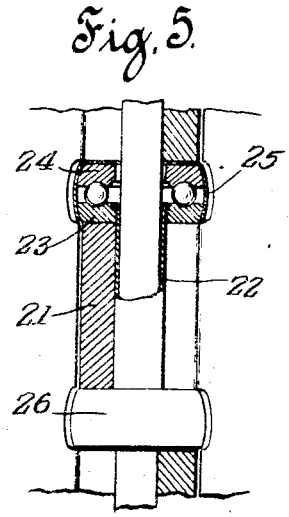
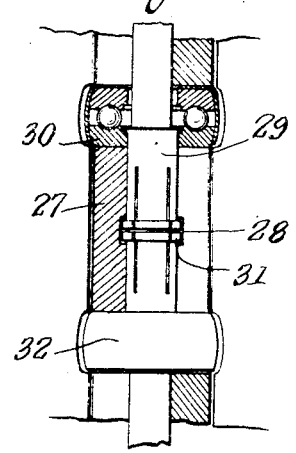
INVENTOR
H. H. Raymond
BY
ATTORNEY Patented Aug. 16, 1927.

1,639,633

UNITED STATES PATENT OFFICE.

HORACE H. RAYMOND, OF NEW BRITAIN, CONNECTICUT, ASSIGNOR TO THE STANLEY WORKS, OF NEW BRITAIN, CONNECTICUT, A CORPORATION OF CONNECTICUT.

BALL-BEARING HINGE.

Application filed December 14, 1923. Serial No. 680,600.

My invention relates to a construction of the type of that of the Myers Patent #1,409,461 of March 14th, 1922. One object of this invention is to construct the parts so as to obtain many of the advantages of such a construction and at the same time facilitate lubrication. Another object in the preferred form is to reduce the number of parts. Another object is to reduce the amount of brass or other non-ferrous metal required. Another object is to reduce the friction between the parts.

In carrying out the invention in its preferred form I provide the knuckle of one of the leaves with an integral collar which is riveted or spun over so as to lock one of the bearing washers in place, leaving the other bearing washer and the housing free to turn with the superposed knuckle.

Fig. 1 is a front view of a hinge embodying the improvements of my invention.

Fig. 2 is an enlarged fragmentary view showing parts of the hinge in section.

Fig. 3 is an exploded view of one of the bearings and adjacent parts of a knuckle.

Fig. 4 is a detail edge view of one of the anti-friction bearings.

Figs. 5 and 6 are fragmentary views partially in section showing modified forms of construction.

The hinge leaves 7 and 8 are provided with any suitable number of interfitting or coacting knuckles such as 9 and 10 on leaves 7 and 11; 12 and 13 on leaf 8.

Each anti-friction device consists of duplicate washers 14 and 15 with an interposed series of balls 16 encased in a housing 17. These washers are preferably of hardened steel grooved to receive the balls, and the casing 17 may be of any suitable non-corrosive material such as brass, bronze or copper. The knuckle 12 is provided with an integral projecting collar or sleeve 18 which projects through or part way through the washer 14 and is spun over or riveted to hold it in place. The pintle 19 extends through the knuckles to hold them together.

It will be noted that there is a space 20 provided between the pintle 19 and the inner edge of the washer 15 through which lubricating material may be fed to the bearing. When the parts are assembled, the washer 14 is held securely to the knuckle 12 by the collar 18. The housing or casing 17 of course turns with the upper washer 15 and consequently it is necessary to leave the lower edge of the housing 17 free to turn with respect to the washer 14. It will be noted that this type of construction requires the use of only a minimum amount of the non-ferrous or non-corrosive casing since the parts are held in position without the use of any separate tube, as shown in the Myers patent. It would be noted that this form of construction may be assembled by first riveting the washer 14 to the knuckle 12, and then adding the balls, washer 15 and casing 17. Contrariwise, the outer casing 17 and the washer 15 and balls 16 may be removed if necessary without disturbing the washer 14. It will also be understood that another anti-friction device may be secured on the opposite end of the knuckle 12 as shown in Fig. 2.

In the form shown in Fig. 5, the knuckle 21 supports an anti-friction device which is held in place by means of a sleeve 22 whose upper end is riveted over on the lower washer 23. In this case the sleeve 22 and washer 23 are fixed with respect to the knuckle 21 leaving the upper washer 24 and housing 25 free to turn. Another anti-friction device 26 may be secured on the lower end of the knuckle, if desired, by means of the tube 22. In the form shown in Fig. 6, the knuckle 27 is provided with a groove 28. The anti-friction device in this case is provided with a depending sleeve 29 riveted to the lower washer 30. On the lower end of the sleeve 29 are spring fingers terminating in shoulders 31 adapted to engage in the groove 28. Another anti-friction device 32 may be provided on the lower end of the knuckle in the same way if desired. The forms shown in Figs. 5 and 6 are claimed specifically in my copending application No. 131,662, filed August 26, 1926, which is a division of the present application.

I claim:

1. A ball bearing hinge comprising a pair of leaves with coacting knuckles, an anti-friction device between adjacent knuckles comprising two hardened washers with a series of anti-friction members adapted to roll between them and a surrounding casing, one of said knuckles having an integral collar spun over the inner edge of one of the washers to hold the anti-friction device in place.

2. A butt hinge including a pair of leaves having coacting knuckles, an anti-friction device located between adjacent knuckles and comprising two washers with anti-friction members between the washers, a casing secured to one of the washers and surrounding the outer edge of the other washer, one of said knuckles having an integral portion extending therefrom and riveted over the inner edge of one of said washers to hold it in place and a pintle passing through said knuckles to hold said leaves together, the other washer having a central passage larger than the pintle to leave a passage for the insertion of lubricant.

3. A butt hinge including a pair of leaves with coacting knuckles, an anti-friction device located between adjacent knuckles and consisting of bearing washers with grooved faces and anti-friction members adapted to roll between them located in said grooved faces, a separately formed casing surrounding the outer edges of said washers and a member projecting from one of said knuckles and having an edge spun over the inner edge of the adjacent washer leaving the inner edge of the other washer open for the insertion of lubricant.

4. A ball bearing hinge comprising a pair of leaves with coacting knuckles and a connecting pintle, an anti-friction device between adjacent knuckles comprising two washers with a series of anti-friction members adapted to roll between them and a surrounding casing, one of said knuckles having an integral collar connected to the adjacent washer around the pintle to hold the anti-friction device in place, the other washer being rotatable independently of that washer to which said collar is connected.

5. A hinge including a pair of leaves having coacting knuckles, a pintle passing through said knuckles to hold said leaves together, an anti-friction device located between adjacent knuckles and comprising two washers with anti-friction members between the washers, a casing surrounding the outer edges of the washers, one of said knuckles being positively secured directly to its adjacent washer to hold it in place.

6. A hinge including a pair of leaves with coacting knuckles, a pintle connecting said knuckles, an anti-friction device located between adjacent knuckles and consisting of bearing washers, anti-friction members adapted to roll and located between said washers and a separately formed casing surrounding the outer edges of said washers and a tubular member extending from one of said knuckles and having an edge secured to the inner edge of the adjacent washer and connecting the same to the knuckle.

7. A hinge comprising leaf members having overlapping knuckles, an anti-friction bearing unit between adjacent overlapping knuckles and comprising an outer bearing with respect to one of said knuckles, and other parts including an inner bearing, a series of anti-friction devices adapted to roll between the bearings and a housing holding said outer and inner bearings together, and means for securing said bearing unit to the corresponding adjacent knuckle including a tube extending from such knuckle and interlocking with one of said other parts while leaving said outer bearing free to turn with the other knuckle independently of the tube.

8. A hinge comprising leaf members having overlapping knuckles, an anti-friction bearing unit between adjacent overlapping knuckles and comprising two bearing members, devices adapted to roll between said bearing members and a housing enclosing the outer edges of and holding said bearing members together, means for securing said bearing unit to one of said adjacent knuckles including means extending between such knuckle and the bearing unit and interlocking with an inner portion of said bearing unit while leaving the outer bearing member free to turn with the other knuckle, and a pintle connecting said knuckles and passing through said bearing unit.

9. A hinge comprising leaf members having overlapping knuckles, a bearing unit between adjacent overlapping knuckles and comprising two bearing members with devices adapted to roll between said bearing members and a housing holding said bearing members together and enclosing the rolling devices, and means for securing said bearing unit to one of said adjacent knuckles including a tubular member extending from such knuckle only part way through the bearing unit and part way to the inner surface of the outer bearing member and formed to overstand an inner portion of said bearing unit and hold it in place relative to the knuckle while leaving the outer bearing free and a pintle connecting said knuckles and passing through said bearing unit.

10. A hinge comprising leaf members havoverlapping knuckles, an anti-friction bearing unit between adjacent overlapping knuckles and comprising an outer bearing with respect to one of said knuckles, and other parts including an inner bearing, a series of anti-friction devices adapted to roll between the bearings, and a housing around the outside of and holding said inner and outer bearings together, and means for positively securing said bearing unit to an adjacent knuckle against longitudinal removal, said securing means being in co-operation with said unit inwardly of the outer bearing while leaving the outer bearing free to turn with its adjacent knuckle independently of the inner bearing.

H. H. RAYMOND.